(12) United States Patent
Sharifi et al.

(10) Patent No.: US 11,817,106 B2
(45) Date of Patent: **\*Nov. 14, 2023**

(54) SELECTIVELY STORING, WITH MULTIPLE USER ACCOUNTS AND/OR TO A SHARED ASSISTANT DEVICE: SPEECH RECOGNITION BIASING, NLU BIASING, AND/OR OTHER DATA

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,863

(22) Filed: Nov. 8, 2022

(65) Prior Publication Data

US 2023/0055608 A1  Feb. 23, 2023

Related U.S. Application Data

(63) Continuation of application No. 17/005,180, filed on Aug. 27, 2020, now Pat. No. 11,532,313.

(51) Int. Cl.

| G10L 17/22 | (2013.01) |
| G10L 17/04 | (2013.01) |
| G10L 17/06 | (2013.01) |
| G06V 40/16 | (2022.01) |
| G10L 15/22 | (2006.01) |

(Continued)

(52) U.S. Cl.
CPC ............ *G10L 17/22* (2013.01); *G06V 40/172* (2022.01); *G10L 15/07* (2013.01); *G10L 15/18* (2013.01); *G10L 15/22* (2013.01); *G10L 17/04* (2013.01); *G10L 17/06* (2013.01); *G10L 17/00* (2013.01); *G10L 2015/223* (2013.01)

(58) Field of Classification Search
CPC ......... G10L 17/22; G10L 15/07; G10L 15/18; G10L 15/22; G10L 17/04; G10L 17/06; G10L 17/00; G10L 2015/223; G06V 40/172
USPC ........................................................ 704/235
See application file for complete search history.

(56) References Cited

U.S. PATENT DOCUMENTS

| 5,727,124 A * | 3/1998 | Lee ........................ G10L 15/065 |
| | | 704/E15.009 |
| 7,457,745 B2 * | 11/2008 | Kadambe ................ G10L 15/07 |
| | | 704/243 |

(Continued)

*Primary Examiner* — Edwin S Leland, III
(74) *Attorney, Agent, or Firm* — Gray Ice Higdon

(57) ABSTRACT

Some implementations relate to performing speech biasing, NLU biasing, and/or other biasing based on historical assistant interaction(s). It can be determined, for one or more given historical interactions of a given user, whether to affect future biasing for (1) the given user account, (2) additional user account(s), and/or (3) the shared assistant device as a whole. Some implementations disclosed herein additionally and/or alternatively relate to: determining, based on utterance(s) of a given user to a shared assistant device, an association of first data and second data; storing the association as accessible to a given user account of the given user; and determining whether to store the association as also accessible by additional user account(s) and/or the shared assistant device.

16 Claims, 5 Drawing Sheets

(51) Int. Cl.
  *G10L 15/07*  (2013.01)
  *G10L 15/18*  (2013.01)
  *G10L 17/00*  (2013.01)

(56) References Cited

U.S. PATENT DOCUMENTS

| | | | | |
|---|---|---|---|---|
| 9,460,713 | B1* | 10/2016 | Moreno Mengibar | G10L 15/197 |
| 9,997,161 | B2* | 6/2018 | Gong | G10L 15/26 |
| 10,269,368 | B2* | 4/2019 | Jensen | G10L 21/0264 |
| 10,433,076 | B2* | 10/2019 | Jensen | H04R 25/505 |
| 10,463,476 | B2* | 11/2019 | Bolner | A61F 2/18 |
| 10,861,478 | B2* | 12/2020 | Jensen | G10L 21/0208 |
| 11,049,013 | B1* | 6/2021 | Duong | G06N 3/08 |
| 11,118,937 | B2* | 9/2021 | Kabakian | G01V 13/00 |
| 11,170,289 | B1* | 11/2021 | Duong | G06N 3/048 |
| 11,188,778 | B1* | 11/2021 | Ojard | G06V 10/762 |
| 11,210,586 | B1* | 12/2021 | Duong | G06N 3/04 |
| 11,222,257 | B1* | 1/2022 | Ko | G06N 3/045 |
| 11,347,297 | B1* | 5/2022 | Ko | G06F 1/3275 |
| 11,468,145 | B1* | 10/2022 | Duong | G06F 17/16 |
| 11,568,227 | B1* | 1/2023 | Ko | G06N 3/04 |
| 11,586,910 | B1* | 2/2023 | Duong | G06N 5/04 |
| 2004/0230420 | A1* | 11/2004 | Kadambe | G10L 15/07 704/E15.011 |
| 2005/0216266 | A1* | 9/2005 | Gong | G10L 15/065 704/E15.009 |
| 2009/0012841 | A1* | 1/2009 | Saft | G06Q 30/02 705/7.29 |
| 2009/0112874 | A1* | 4/2009 | Fisher | G06F 16/986 707/999.005 |
| 2010/0005061 | A1* | 1/2010 | Basco | G06F 16/355 704/9 |
| 2010/0005087 | A1* | 1/2010 | Basco | G06F 16/951 707/E17.017 |
| 2012/0226640 | A1* | 9/2012 | Chen | G06N 7/01 706/12 |
| 2013/0204881 | A1* | 8/2013 | Su | G06N 5/043 707/748 |
| 2014/0356846 | A1* | 12/2014 | Su | G09B 5/02 434/362 |
| 2017/0270929 | A1* | 9/2017 | Aleksic | G10L 15/22 |
| 2017/0345439 | A1* | 11/2017 | Jensen | H04R 25/505 |
| 2018/0233160 | A9* | 8/2018 | Jensen | G10L 21/0264 |
| 2018/0317027 | A1* | 11/2018 | Bolner | A61N 1/36036 |
| 2019/0122657 | A1* | 4/2019 | James | G06F 40/205 |
| 2019/0200143 | A1* | 6/2019 | Jensen | H04R 3/04 |
| 2019/0378531 | A1* | 12/2019 | Jensen | G10L 21/0232 |
| 2019/0385628 | A1* | 12/2019 | Nakashika | G10L 17/04 |
| 2020/0082827 | A1* | 3/2020 | Lee | H04L 12/282 |
| 2021/0182660 | A1* | 6/2021 | Amirguliyev | G06N 3/084 |
| 2021/0191401 | A1* | 6/2021 | Sinyavskiy | G01C 21/1656 |
| 2021/0232921 | A1* | 7/2021 | Parashar | G06F 9/5027 |
| 2021/0350163 | A1* | 11/2021 | Ojard | G06V 10/762 |
| 2021/0350346 | A1* | 11/2021 | Edwards | G06Q 20/1085 |
| 2022/0067418 | A1* | 3/2022 | Ojard | G06V 20/698 |
| 2022/0068281 | A1* | 3/2022 | Sharifi | G10L 15/22 |
| 2022/0092399 | A1* | 3/2022 | Boyd | G06F 9/5027 |
| 2022/0157321 | A1* | 5/2022 | Sharifi | G10L 17/06 |
| 2022/0183608 | A1* | 6/2022 | Zhu | A61B 5/7203 |
| 2023/0086088 | A1* | 3/2023 | Ogishima | G07C 5/008 340/905 |

* cited by examiner

_SELECTIVELY STORING, WITH MULTIPLE USER ACCOUNTS AND/OR TO A SHARED ASSISTANT DEVICE: SPEECH RECOGNITION BIASING, NLU BIASING, AND/OR OTHER DATA_

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Automated assistants typically rely upon a pipeline of components in interpreting and responding to user requests. For example, an automatic speech recognition (ASR) engine can be used to process audio data that includes a spoken utterance, to generate a transcription (i.e., sequence of term(s) and/or other token(s)) of the user's utterance. As another example, a natural language understanding (NLU) engine can be used to process text of a request (e.g., text converted from a spoken utterance using ASR) to generate a symbolic representation, or belief state, that is a semantic representation of the text. For instance, the belief state could include intent(s) that correspond to the text and optionally parameter(s) (e.g., slot values) for the intent(s). The belief state, once fully formed (e.g., all mandatory parameters resolved) through one or more dialog turns, represents action(s) to be performed responsive to the spoken utterance. A separate fulfillment component can then utilize the fully formed belief state to perform the action(s) that corresponds to the belief state.

In performing ASR, recognition of a spoken utterance can be performed while biasing the recognition toward certain term(s). For example, speech recognition of a spoken utterance can be biased toward terms that are relevant to points of interest that are currently nearby (e.g., names of nearby stores), can be biased toward terms that are relevant to a current automated assistant dialog (e.g., toward food terms if a topic of the current dialog is cooking), and/or can be biased toward terms that are deemed of interest to the user providing the spoken utterance (e.g, based on the user having previously spoken or typed those terms or related terms).

Biasing speech recognition toward certain term(s) can be accomplished utilizing one or more of various biasing techniques. As one example, a language model, utilized in some ASR techniques, can include weights for terms, where each of the weights reflect a corresponding degree of biasing for a corresponding term. As another example, biasing toward a term can be accomplished just by its inclusion in a language model utilized in ASR. As yet another example, a decoding graph, optionally utilized in ASR, can be decoded while biasing toward certain terms. As yet another example, biasing can be utilized to generate one or more additional hypotheses, that are in addition to an initial hypothesis (or initial hypotheses) generated by an ASR model, and those additional hypotheses considered as candidate transcriptions. For instance, an additional hypothesis can be generated and/or selected based on including biasing term(s). Additional and/or alternative ASR biasing approaches can be utilized.

Separately, in performing NLU, generating the semantic representation of the text can be biased. For example, which intent(s) and/or parameter(s) are determined for a given transcription can be dependent on the NLU biasing that is applied. For instance, "play Hypothetical Song" could, for a first user, result in an intent of playing a song with a song parameter of "Hypothetical Song" that is by "Artist A". On the other hand, for a second user the same utterance could instead result in an intent of playing a song with a song parameter of "Hypothetical Song" that is by "Artist B". The different song parameters could be resolved differently based on the first user listening to Artist A in the past without listening to Artist B, while the second user listened to Artist B in the past without listening to Artist A. The different song parameters could alternatively be resolved differently based on the first user having previously responded to a disambiguation prompt with "Artist A" and the second user having previously responded to the disambiguation prompt with "Artist B". As another instance of NLU biasing, "chill out the lights" could, for a first user, result in an intent of "dim" and, for a second user, result in an intent of "turn off". The intents could be resolved differently based on, for example, the first and second users having responded differently in the past to disambiguation prompts that sought disambiguation of the desired intent for "turn off". Biasing NLU can be accomplished utilizing various techniques. For example, a candidate parameter can be selected over another candidate parameter for a user based on that candidate parameter being deemed to be of interest to the user and/or the user selecting that candidate parameter in the past, optionally over the other candidate parameter.

SUMMARY

Some implementations disclosed herein relate to performing speech biasing, NLU biasing, and/or other biasing based on historical assistant interaction(s). As one example, biasing toward "patent" terms (e.g., "patent", "invention", "claims", etc.) during ASR in response to one or more past submissions of patent related utterances to a shared assistant device. As another example, additionally or alternatively biasing toward certain intent(s) and/or parameter(s) during NLU in response to past interaction(s) that relate to those intent(s) and/or parameter(s). In some of those implementations, the historical assistant interaction(s) are interactions that occur via a shared assistant device. A shared assistant device is a client device that includes an automated assistant interface for interacting with an automated assistant (implemented on the client device and/or on remote server(s) in network communication with the client device), and that is interacted with by multiple users. One or more (e.g., all) of the users that interact with the shared assistant device can have a corresponding user account that is for the automated assistant and that is active at the shared assistant device. Guest users that do not have a corresponding user account that is active can also interact with the shared assistant device. One non-limiting example of a shared assistant device is an interactive speaker, optionally with a display, that is in a home setting and that over time is interacted with by multiple family members, each with corresponding user accounts, and by guests.

In implementations that perform biasing based on historical interaction(s) of a given user, those historical interaction(s) can be used to affect biasing, for future interaction(s), for: (1) a given user account for the given user (i.e., biasing for the given user at the shared assistant device and optionally at other assistant device(s) where the given user account is active); (2) additional user account(s), for additional user(s), that are active at the shared assistant device (i.e., biasing for the additional user account(s) at the shared assistant device and optionally at other assistant device(s) where the additional user account(s) are active); and/or (3) for the shared assistant device as a whole (i.e., biasing that occurs for all interactions, at the shared assistant device, by all users, including guest users). Notably, in those implementations all historical interactions of a given user will not affect biasing in the same manner. Put another way, all historical interactions of a given user at the shared assistant device will not exclusively affect biasing for only one of (1) the given user account, (2) additional user account(s), or (3) the shared assistant device as a whole.

Rather, in those implementations, it can be determined, for one or more given historical interactions of a given user, whether to affect future biasing for (1) the given user account, (2) additional user account(s), and/or (3) the shared assistant device as a whole. Put another way, all interactions don't lead to future biasing being applied in the same manner. Rather, feature(s) of each interaction can be analyzed in determining whether to apply related future biasing to (1) the given user account, (2) additional user account(s), and/or (3) the shared assistant device as a whole.

As one example, for first interaction(s) of a given user that are at a shared assistant device and that are related to researching a Hawaii vacation, it can be determined to affect only ASR biasing (e.g., bias toward "Hawaii" and/or "vacation" term(s)) for the given user account of the given user—without affecting biasing for additional user account(s) or the shared assistant device as a whole. However, for second interaction(s) of the given user that are at the shared assistant device and related to controlling a smart thermostat, it can be determined to affect ASR biasing for the shared assistant device as a whole (e.g., biasing will be applied to processing of all spoken utterances, including those from users and guests). Further, for third interaction(s) of the given user that are at the shared assistant device and relate to researching televisions, it can be determined to affect ASR biasing for the given user account and for some or all additional user account(s)—without affecting biasing for the shared assistant device as a whole.

Various feature(s) of an interaction of a given user can be analyzed in determining how to apply future biasing that is related to that interaction. Those features can include, but are not limited to, co-present feature(s), sensitivity feature(s), and/or relationship feature(s).

Co-present feature(s) relate to whether, which, and/or how many additional user(s) were present near the assistant device when the interaction occurred. For example, co-present feature(s) can include whether additional user(s) were present, how many additional user(s) were present, and/or user account identifier(s) for the additional user(s). These can be determined, for example, based on processing of image data from a camera of the assistant device and/or processing of audio data captured at the assistant device (e.g., during the interaction of the given user, or preceding or following the interaction). In some implementations, biasing parameter(s) from the interaction are more likely to be applied beyond just the given user account of the given user when co-present feature(s) indicate additional user(s) are co-present and/or as the quantity of additional user(s) co-present (as indicated by the co-present feature(s)) increases. In some of those implementations, when user account(s) of the co-present user(s) are determined from the co-present feature(s) (e.g., using speaker recognition and/or facial recognition, detecting nearby devices associated with the co-present users using Bluetooth, ultrasonic audio, and/or Wi-Fi), biasing can optionally be extended to user accounts of those co-present user(s) and the given user. In these and other manners, biasing can be applied beyond the given user account in some situations where other user(s) were present during the interaction. As a result of being co-present, such other user(s) may be more likely to be interested in topic(s) of the interaction, may attempt to mimic the interaction in the future, etc.—and by assigning corresponding biasing parameter(s) to user account(s) of such other users in such situations can increase the accuracy of ASR and/or of NLU. On the other hand, biasing may be restricted to just the given user account in some situations where other user(s) were not present, thereby preventing unnecessary storage and/or unnecessary usage of biasing parameters beyond the user account.

Sensitivity feature(s) relate to whether all or aspects of the interaction are deemed potentially sensitive. By determining and utilizing sensitivity feature(s) biasing can be prevented, for user(s) beyond the given user, based on topic(s) and/or term(s) that are the focus of an interaction of the given user and may be private or otherwise sensitive to the given user. In some implementations, sensitivity feature(s) for term(s) and/or topic(s) can include whether those term(s) and/or topic(s) are on an allowed list (e.g., a list of non-sensitive term(s) and/or topic(s)) or a blocked list (e.g., a list of non-sensitive term(s) and/or topic(s)). In some implementations, sensitivity feature(s) for term(s) and/or topic(s) can additionally or alternatively include an inverse document frequency score for those term(s). Generally, an inverse document frequency score that indicates rare occurrence of a term or topic in a corpus of documents can indicate sensitivity, whereas a score that indicates frequent occurrence can indicate non-sensitivity. Further, in some implementations, sensitivity feature(s) for term(s) and/or topic(s) can additionally or alternatively include a probability measure or other output from a machine learning model trained to classify sensitivity. For example, the machine learning model can be trained to process term(s) (e.g., a Word2Vec or other embedding thereof) and to generate output that indicates a degree of sensitivity. As another example, the machine learning model can itself be a Word2Vec model or other term(s) embedding model, can be used to process term(s) to generate an embedding thereof, and the embedding can indicate sensitivity (e.g., based on its distance, in embedding space, to one or more "sensitive" embeddings).

Relationship feature(s) relate to whether, which, and/or how many additional user(s) have had prior assistant interaction(s) that are related to the spoken utterance utilized to determine the biasing parameter(s). For example, assume a spoken utterance of the given user of "play Hypothetical Movie on Hypothetical Streaming service" and recognition biasing parameters related to "media control". Relationship feature(s) can include whether additional user(s) had prior interaction(s) related to media control (e.g., other utterances such as "pause", "turn up the volume"), how many additional user(s) had prior interaction(s) related to media control, how many prior interaction(s) related to media control did such user(s) have, and/or user account identifier(s) for the additional user(s) that had the prior interaction(s) related to media control. In these and other manners, biasing can be applied beyond the given user account in some situations where other user(s) have interacted with the shared assistant device for the same or related topic(s). This can result in adapting biasing on a wider scale (e.g., even on the shared assistant device level) for topic(s) and/or term(s) for which the shared assistant device is often utilized by multiple users. Further, this can prevent adapting biasing on a shared device and/or multiple user accounts level when only a single user interacts with the shared assistant device for certain topic(s) and/or terms. Additionally or alternatively, this can also serve to prevent biasing on topic(s) and/or term(s) that are potentially sensitive and can also serve as proxy sensitivity feature(s) (described above), but is referenced herein as relationship feature(s).

Some implementations disclosed herein additionally and/or alternatively relate to: determining, based on utterance(s) of a given user to a shared assistant device, an association of first data and second data; storing the association as accessible to a given user account of the given user; and determining whether to store the association as also accessible by additional user account(s) and/or the shared assistant device. As an example, assume the utterance(s) consist of "remember that my anniversary is June 30th" and the determined association is of first data related to "anniversary" (e.g., the term itself and/or synonyms) to second data related to "June 30th" (e.g., the date itself). Implementations can make that association accessible to the given user account based on the given user providing the utterance (e.g., as determined using speaker recognition and/or other recognition technique(s)). Making the association accessible to the given user account can enable it to be utilized in responding to a future utterance of the user such as "when is my anniversary". Further, implementations can determine whether to also make that association accessible to other user account(s) and/or the shared assistant device. Making the association accessible to the additional user account(s) can enable it to be utilized in responding to a future utterance of the corresponding additional user(s) and making it accessible to the shared assistant device can enable it to be utilized in responding to any future utterance at the shared assistant device. Various feature(s) of an interaction of a given user can be analyzed in determining accessibility of the association. Those features can include, but are not limited to, the co-present feature(s), the sensitivity feature(s), and/or the relationship feature(s) described herein.

In addition, some implementations may include a system including one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
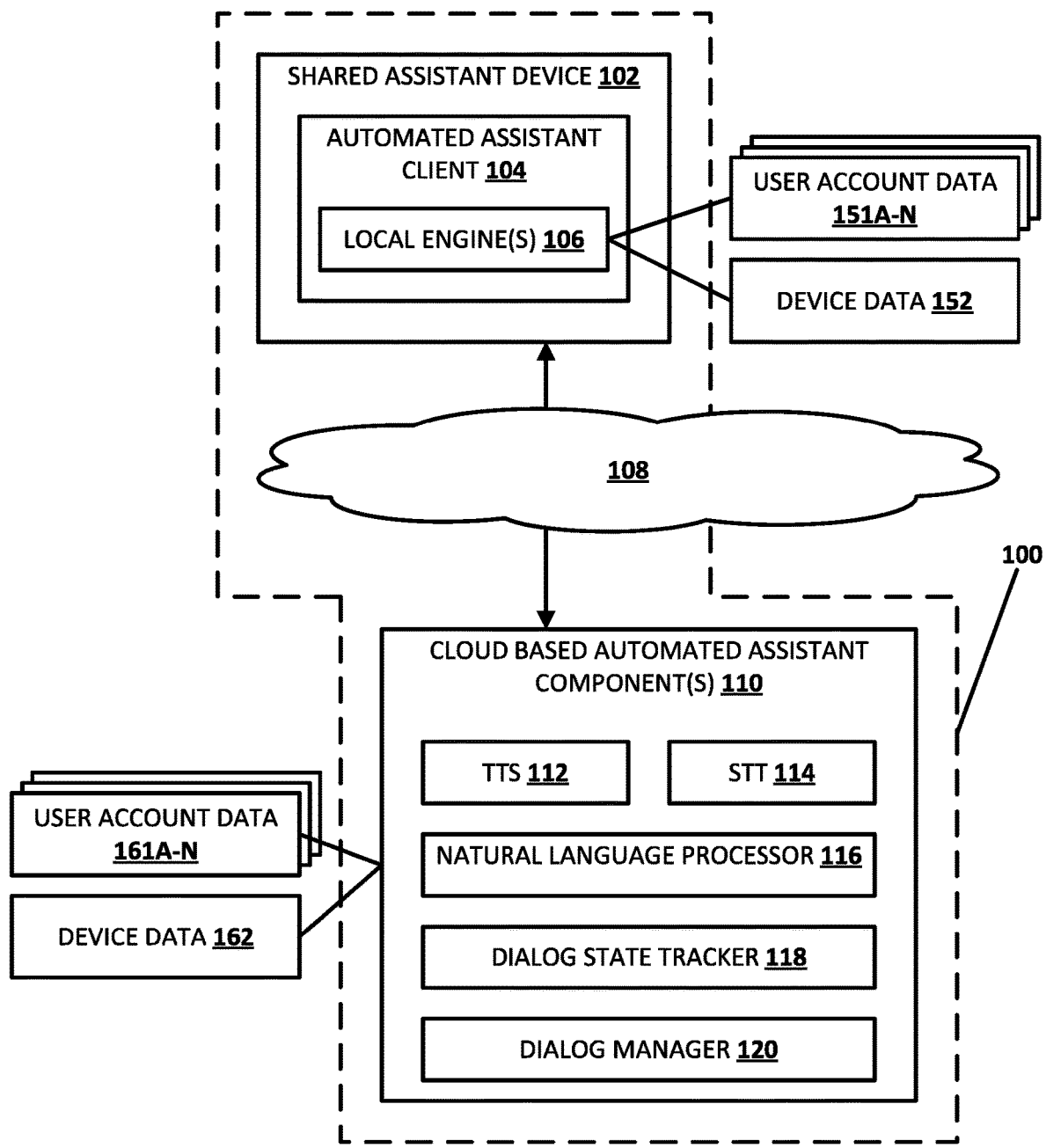
FIG. 1 is a block diagram of an example computing environment in which implementations disclosed herein may be implemented.

Turning initially to FIG. 1, an example environment is illustrated where various implementations can be performed. FIG. 1 includes a shared assistant device 102, which executes an instance of an automated assistant client 104. One or more cloud-based automated assistant components 110 can be implemented on one or more computing systems (collectively referred to as a "cloud" computing system) that are communicatively coupled to client device 102 via one or more local and/or wide area networks (e.g., the Internet) indicated generally at 108.

An instance of an automated assistant client 104, by way of its interactions with one or more cloud-based automated assistant components 110, may form what appears to be, from the user's perspective, a logical instance of an automated assistant 100 with which the user may engage in a human-to-computer dialog. An instance of such an automated assistant 100 is depicted in FIG. 1.

The shared assistant device 102 may be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device). As described herein, shared assistant device 102 can be utilized by multiple users within a household, a business, or other environment. Further, and as also described herein, some of those multiple users may be registered or verified with the shared assistant device 102 and have a corresponding user account accessible via the shared assistant device 102, while other user(s) may be viewed as guest users. Speaker recognition, facial recognition, and/or other technique(s) (e.g., pin entry) can be utilized to determine which of multiple user account(s) is interacting with the assistant 100 at a given time. Additional and/or alternative shared assistant devices may be provided. In various implementations, the shared assistant device 102 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application programming interface) with the automated assistant 100, or include their own instance of an automated assistant application (that may also interface with the cloud-based automated assistant component(s) 110).

Automated assistant 100 engages in human-to-computer dialog sessions with a user via user interface input and output devices of the client device 102. To preserve user privacy and/or to conserve resources, in many situations a user must often explicitly invoke the automated assistant 100 before the automated assistant will fully process a spoken utterance. The explicit invocation of the automated assistant 100 can occur in response to certain user interface input received at the client device 102. For example, user interface inputs that can invoke the automated assistant 100 via the client device 102 can optionally include actuations of a hardware and/or virtual button of the client device 102. Moreover, the automated assistant client can include one or more local engines 106, such as an invocation engine that is operable to detect the presence of one or more spoken invocation phrases. The invocation engine can invoke the automated assistant 100 in response to detection of one of the spoken invocation phrases. For example, the invocation engine can invoke the automated assistant 100 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines 106 and/or cloud-based automated assistant components 110 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 100.

The one or more local engine(s) 106 of automated assistant 100 are optional, and can include, for example, the invocation engine described above, a local speech-to-text ("STT") engine (that converts captured audio to text, and that is also referred to herein as an ASR engine), a local text-to-speech ("TTS") engine (that converts text to speech), a local natural language processor (that determines semantic meaning of audio and/or text converted from audio), and/or other local components. Because the client device 102 is relatively constrained in terms of computing resources (e.g., processor cycles, memory, battery, etc.), the local engines 106 may have limited functionality relative to any counterparts that are included in cloud-based automated assistant components 110.

Cloud-based automated assistant components 110 leverage the virtually limitless resources of the cloud to perform more robust and/or more accurate processing of audio data, and/or other user interface input, relative to any counterparts of the local engine(s) 106. Again, in various implementations, the client device 102 can provide audio data and/or other data to the cloud-based automated assistant components 110 in response to the invocation engine detecting a spoken invocation phrase, or detecting some other explicit invocation of the automated assistant 100.

The illustrated cloud-based automated assistant components 110 include a cloud-based TTS module 112, a cloud-based STT module 114, a natural language processor 116, a dialog state tracker 118, and a dialog manager 120. In some implementations, one or more of the engines and/or modules of automated assistant 100 may be omitted, combined, and/or implemented in a component that is separate from automated assistant 100. Further, in some implementations automated assistant 100 can include additional and/or alternative engines and/or modules. Cloud-based STT module 114 can convert audio data into text, which may then be provided to natural language processor 116.

Cloud-based TTS module 112 can convert textual data (e.g., natural language responses formulated by automated assistant 100) into computer-generated speech output. In some implementations, TTS module 112 may provide the computer-generated speech output to client device 102 to be output directly, e.g., using one or more speakers. In other implementations, textual data (e.g., natural language responses) generated by automated assistant 100 may be provided to one of the local engine(s) 106, which may then convert the textual data into computer-generated speech that is output locally.

Natural language processor 116 of automated assistant 100 processes free form natural language input and generates, based on the natural language input, annotated output for use by one or more other components of the automated assistant 100. For example, the natural language processor 116 can process natural language free-form input that is textual input that is a conversion, by STT module 114, of audio data provided by a user via client device 102. The generated annotated output may include one or more annotations of the natural language input and optionally one or more (e.g., all) of the terms of the natural language input.

In some implementations, the natural language processor 116 is configured to identify and annotate various types of grammatical information in natural language input. In some implementations, the natural language processor 116 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 116 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 116 may rely on annotations from one or more other components of the natural language processor 116. In some implementations, in processing a particular natural language input, one or more components of the natural language processor 116 may use related prior input and/or other related data outside of the particular natural language input to determine one or more annotations.

In some implementations, dialog state tracker 118 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 120 may be configured to map a current dialog state, e.g., provided by dialog state tracker 118, to one or more "responsive actions" of a plurality of candidate responsive actions that are then performed by automated assistant 100. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 100 outputting additional natural language dialog. This responsive dialog may include, for instance, requests that the user provide parameters for some action (i.e., fill slots) that dialog state tracker 118 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

FIG. 1 also illustrates local user account data 151A-N and local device data 152. The local user account data 151A-N can include, for example, biasing parameters for each of multiple user accounts (e.g., 151A can include parameters for a first user account, 151B can include parameters for a second user account, etc.). Some of the biasing parameter(s) can be applied to corresponding local user account data utilizing techniques described herein. In processing a spoken utterance from a given user, local engine(s) 106 (e.g., local ASR/STT and/or NLU engine(s)) can utilize such biasing parameters for one of the user account data 151A-N that corresponds to the given user. The local user account data 151A-N can additionally or alternatively include, for example, accessibility data for each of multiple user accounts (e.g., 151A can include indications of association(s) that are accessible to a first user account, 151B can include indication(s) of association(s) that are accessible to a second user account, etc.). Some of the accessibility data can be applied to corresponding local user account data utilizing techniques described herein. In processing a spoken utterance from a given user, local engine(s) 106 (e.g., local ASR/STT and/or NLU engine(s)) can utilize such accessibility data for one of the user account data 151A-N that corresponds to the given user. The local device data 152 can include biasing parameters and/or accessibility data that is applicable to the shared assistant device 102 as a whole.

FIG. 1 also illustrates cloud user account data 161A-N and cloud device data 162. The cloud user account data 161A-N can be similar to (e.g., the same as) the local user account data 151A-N described above, but utilized by the cloud based automated assistant component(s) 110 instead of the local engine(s) 106. Likewise, the cloud device data 162 can be similar to (e.g., the same as) the local device data 152 described above, but is utilized by the cloud based automated assistant component(s) 110 instead of the local engine(s) 106. For example, the cloud based automated assistant component(s) 110, in processing an utterance provided at the shared assistant device 102, can receive an identifier of the shared assistant device 102 and utilize that identifier in accessing the corresponding cloud device data 162 for the shared assistant device 102.

Figure 2:
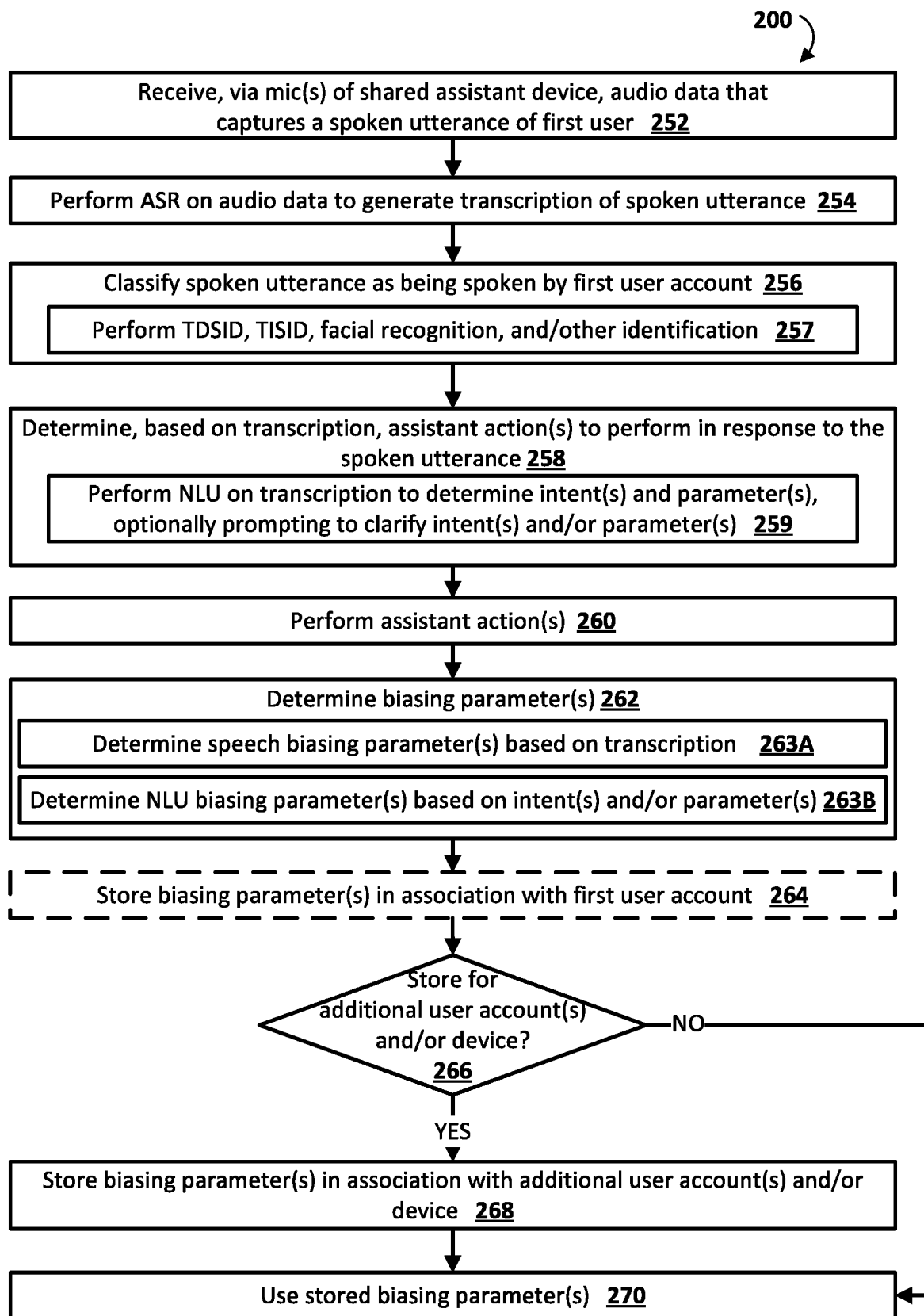
FIG. 2 is a flowchart illustrating an example method of determining, storing, and using biasing parameters, in accordance with various implementations.

FIG. 2 is a flowchart illustrating an example method 200 of determining, storing, and using biasing parameters. For convenience, the operations of the flow chart are described with reference to a system that performs the operations. This system may include various components of various computer systems, such as one or more components of automated assistant 100. Moreover, while operations of method 200 are shown in a particular order, this is not meant to be limiting. One or more operations may be reordered, omitted or added.

At block 252, the system receives, via microphone(s) of a shared assistant device, audio data that captures a spoken utterance of the first user.

At block 254, the system performs ASR on audio data to generate a transcription of the spoken utterance. The system can perform ASR utilizing speech biasing parameter(s) that have previously been assigned to a first user account of the first user and/or to the shared assistant device (e.g., in one or more prior iterations of method 200). It is noted that when the system performs ASR utilizing speech biasing parameter(s) that have previously been assigned to the first user account, block 256 (below) can be performed to determine the spoken utterance is spoken by the first user account.

At block 256, the system classifies spoken utterance as being spoken by a first user account. Put another way, the system determines the first user account is associated with the spoken utterance (e.g., the first user provided the spoken utterance). In some implementations, block 256 includes sub-block 257, in which the system performs text-dependent speaker identification (TDSID) (e.g., based on a hot phrase that precedes the spoken utterance), text-independent speaker identification (TISID) (e.g., based on the spoken utterance), facial recognition (e.g., based on image(s) from a camera of the shared assistant device), and/other identification technique(s) to classify the spoken utterance as being spoken by the first user account.

At block 258, the system determines, based on the transcription, assistant action(s) to perform in response to the spoken utterance. In some implementations, block 258 includes sub-block 259, in which the system performs NLU on the transcription to determine intent(s) and parameter(s). In some of those implementations, the system optionally prompts the first user (e.g., utilizing visual and/or audible prompt(s)) to clarify intent(s) and/or parameter(s). For example, the user can be prompted to disambiguate between a "play music" intent and a "play video" intent. As another example, the user can be prompted to disambiguate between a "smart device 1" parameter and a "smart device 2" parameter.

At block 260, the system performs the assistant action(s).

At block 262, the system determines biasing parameter(s). In some implementations, block 262 includes sub-blocks 263A and/or 263B. At sub-block 263A the system determines speech biasing parameter(s) based on the transcription. For example, the system can determine speech biasing parameter(s) based on term(s) in the transcription and/or based on term(s) that are not in the transcription but are related to term(s) in the transcription and/or topic(s) derived from the transcription. At sub-block 263B the system determines NLU biasing parameter(s) based on intent(s) and/or parameter(s) determined at sub-block 259.

At optional block 264, the system stores the biasing parameter(s) in association with the first user account. This can be based on classifying the spoken utterance as being spoken by the first user account.

At block 266, the system determines whether to store the biasing parameter(s) for additional user account(s) and/or for the shared assistant device as a whole. Block 266 can, in some implementations, include one or more of the blocks of FIG. 3, described below.

If the determination at block 266 is yes, the system proceeds to block 268 and stores the biasing parameter(s) in association with the additional user account(s) and/or the shared assistant device, then proceeds to block 270. If the determination at block 266 is no, the system proceeds directly to block 270.

At block 270, the system uses the stored biasing parameter(s). For example, the system can use the stored biasing parameter(s) in block 254 and/or block 258 in another iteration of method 200. Whether the biasing parameter(s) are utilized in another iteration will depend on whether the biasing parameter(s) are stored in association with the first user account, additional user account(s), and/or the device as a whole—and optionally on who is providing the utterance in the other iteration.

Figure 3:
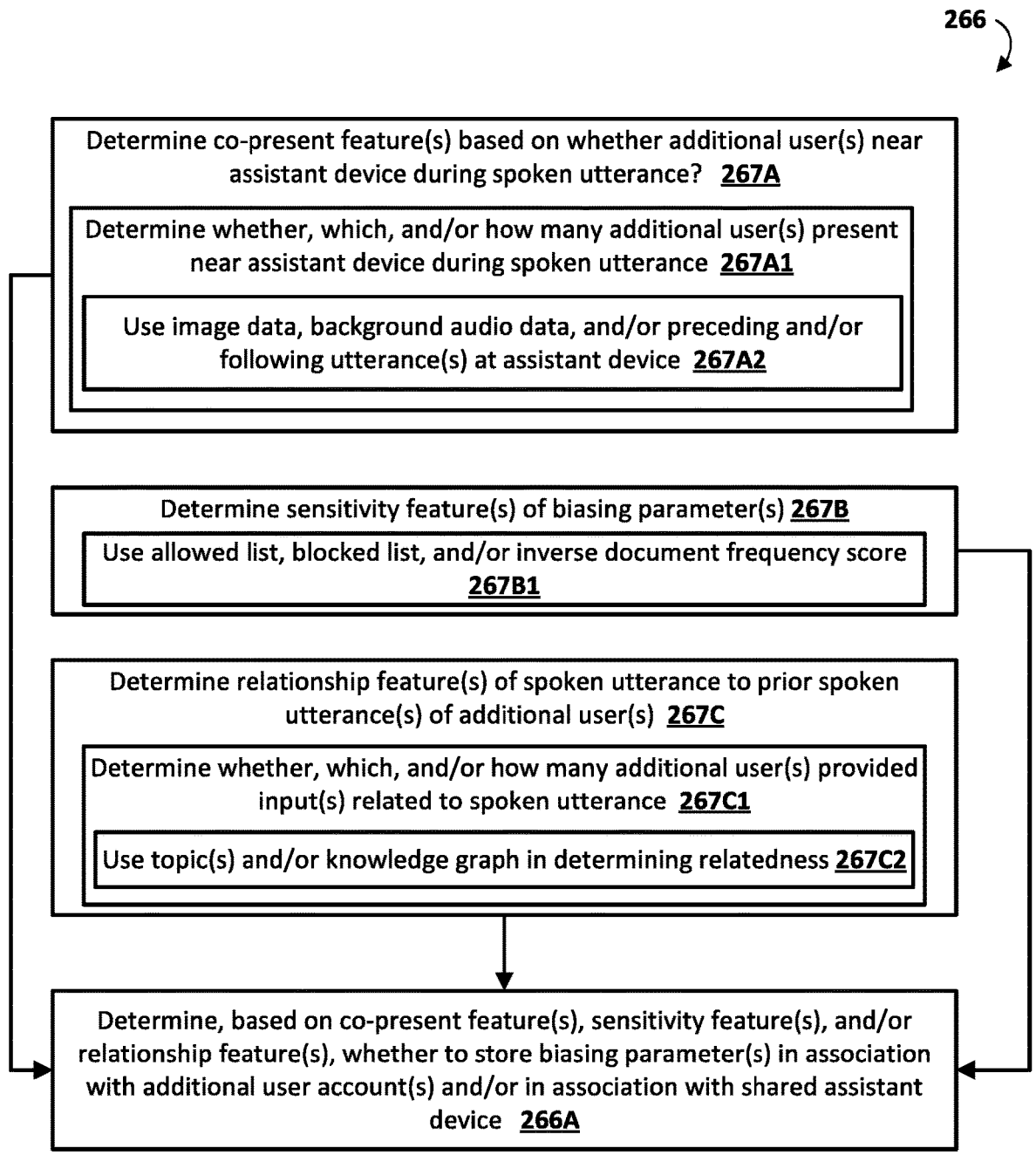
FIG. 3 is a flowchart illustrating an example method of determining whether to store biasing parameter(s) in association with additional user account(s) and/or in association with a shared assistant device, in accordance with various implementations.

Turning now to FIG. 3, it is a flowchart illustrating an example implementation of block 266 of FIG. 2.

At block 267A, the system determines co-present feature(s) based on whether additional user(s) are near the assistant device during spoken utterance. Block 267A can include sub-block 267A1, where the system determines co-present feature(s) related to whether, which, and/or how many additional user(s) are present near the assistant device during the spoken utterance. Sub-block 267A1 can itself include a sub-block 267A2, in which the system, in performing sub-block 267A1, uses image data, background audio data, and/or preceding and/or following utterance(s) at the shared assistant device. For example, the system can determine another user is co-present (and optionally an associated user account of the other user) based on receiving, within a threshold amount of time (e.g., one minute or other threshold) before or after the spoken utterance of block 254 (FIG. 2), another spoken utterance classified as being from another user. As another example, the system can determine another user is co-present (and optionally an associated user account of the other user) based on analysis of image data from a camera of the shared assistant device. As yet another example, the system can determine another user is co-present based on detecting, in the audio data of block 254 (FIG. 2), background speech (or other human sound(s)) that is in addition to the spoken utterance.

At block 267B, the system determines sensitivity feature(s) of one or more of the biasing parameter(s) determined at block 262 (FIG. 2). In some implementations, block 267B includes sub-block 267B1, in which the system determines sensitivity feature(s) using an allowed list (e.g., a feature of whether it's on the allowed list), a blocked list (e.g., a feature of whether it's on the blocked list), and/or inverse document frequency score (e.g., a feature that is the score, or is a function of the score).

At block 267C, the system determines relationship feature(s) of the spoken utterance of block 252 (FIG. 2) to prior spoken utterance(s) of additional user(s). In some implementations, block 267C includes sub-block 267C1 in which the system determines whether, which, and/or how many additional user(s) provided input(s) related to the spoken utterance. The system can additionally determine a quantity (overall or per user) of such input(s) and/or temporal recentness of such input(s). One or more of these determinations can be utilized in determining the relationship feature(s). Sub-block 267C1 can itself include a sub-block 267C2 in which the system uses topic(s) and/or a knowledge graph in determining input(s) that are related to the spoken utterance. For example, the system can determine relatedness of a spoken utterance and a prior input based on both relating to the same topic and/or relating to respective entities that have a defined relationship in the knowledge graph (e.g., they are connected to one another directly by an edge, or connected with less than N hops).

At block 266A, the system determines, based on the co-present feature(s), the sensitivity feature(s), and/or the relationship feature(s), whether to store biasing parameter(s) in association with additional user account(s) and/or in association with shared assistant device 266A. In some implementations, only a subset of the features are utilized. In some additional or alternative implementations, the features can all be combined and/or some may overrule other(s). For example, if sensitivity feature(s) indicate sensitivity, it may prevent storing in association with additional user account(s) and/or in association with the shared assistant device—even if co-present features indicate many additional users are present and relationship features indicate many related prior inputs.

Figure 4:
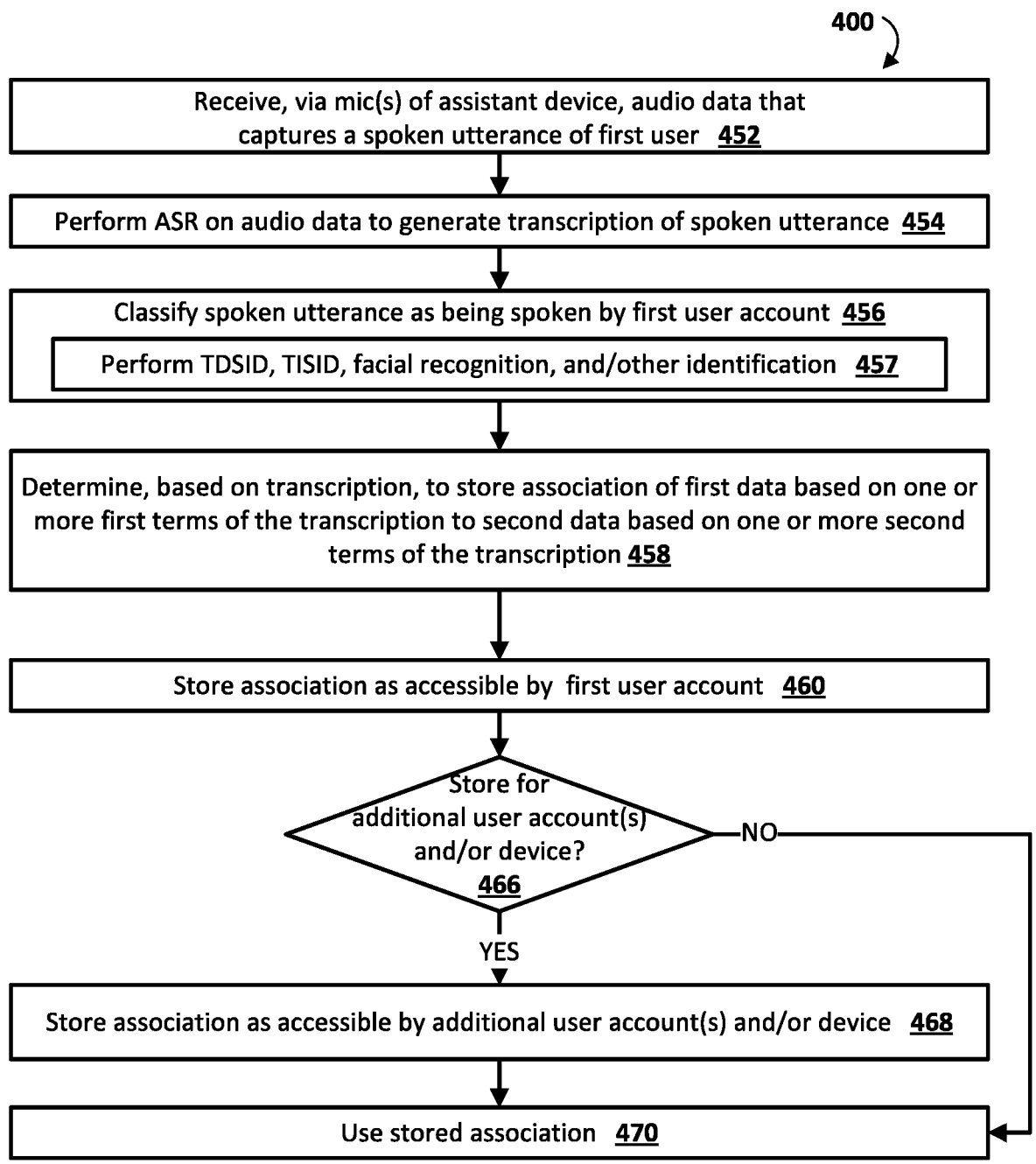
FIG. 4 is a flowchart illustrating an example method of determining an association of first data and second data, storing the association as accessible by user account(s) and/or a shared assistant device, and using the association, in accordance with various implementations.

FIG. 4 is a flowchart illustrating an example method 400 of determining an association of first data and second data, storing the association as accessible by user account(s) and/or a shared assistant device, and using the association. For convenience, the operations of the flow chart are described with reference to a system that performs the operations. This system may include various components of various computer systems, such as one or more components of automated assistant 100. Moreover, while operations of method 400 are shown in a particular order, this is not meant to be limiting. One or more operations may be reordered, omitted or added.

At block 452, the system receives, via microphone(s) of a shared assistant device, audio data that captures a spoken utterance of the first user.

At block 454, the system performs ASR on audio data to generate a transcription of the spoken utterance.

At block 456, the system classifies spoken utterance as being spoken by a first user account. In some implementations, block 456 includes sub-block 457, in which the system performs TDSID, TISID, facial recognition, and/or other identification technique(s) to classify the spoken utterance as being spoken by the first user account.

At block 458, the system determines, based on the transcription, to store an association of first data based on one or more first terms of the transcription to second data based on one or more second terms of the transcription.

At block 460, the system stores the association as accessible by the first user account. This can be based on classifying the spoken utterance as being spoken by the first user account.

At block 466, the system determines whether to store the association as accessible by additional user account(s) and/or by the shared assistant device. Block 466 can, in some implementations, include one or more of the blocks of FIG. 3, described above.

If the determination at block 466 is yes, the system proceeds to block 468 and stores the association as accessible by the additional user account(s) and/or the shared assistant device, then proceeds to block 470. If the determination at block 466 is no, the system proceeds directly to block 470.

At block 470, the system users the stored association in dependence on the stored accessibility/accessibilities determined at block 460 and 466. For example, the system can use the stored association in generating a response to a request that includes the first data and/or the second data. As another example, the system can use the stored association in generating a proactive notification to provide based on the first data and/or the second data Whether the stored association is utilized in generating a response and/or in providing a proactive notification will depend on whether the stored association is accessible to the first user account, additional user account(s), and/or the device as a whole— and optionally on who the response is responsive to and/or for whom the notification is provided.

Figure 5:
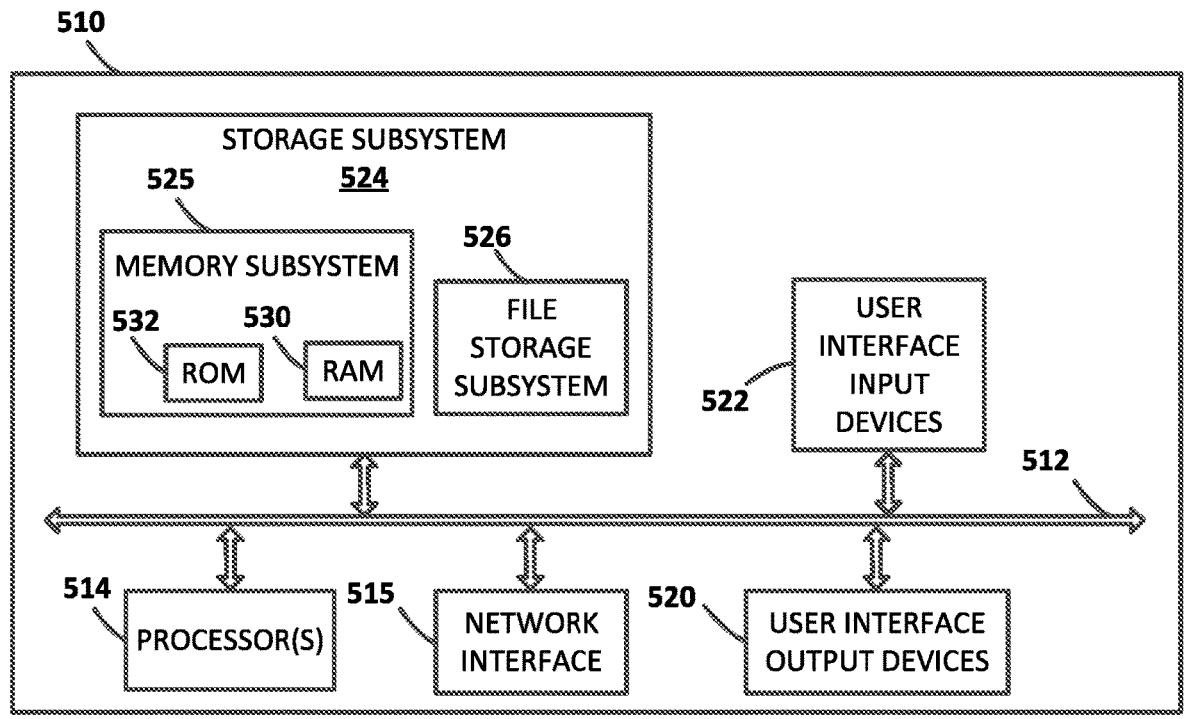
FIG. 5 illustrates an example architecture of a computing device.

FIG. 5 is a block diagram of an example computing device 510 that may optionally be utilized to perform one or more aspects of techniques described herein. In some implementations, one or more of a client computing device, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of one or more of the methods described herein, and/or to implement various components depicted herein.

These software modules are generally executed by processor 514 alone or in combination with other processors. Memory 525 used in the storage subsystem 524 can include a number of memories including a main random access memory ("RAM") 530 for storage of instructions and data during program execution and a read only memory ("ROM") 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes receiving, via one or more microphones of a shared assistant device that is associated with multiple user accounts, audio data that captures a spoken utterance of a first user. The method further includes generating, based on processing the audio data, a transcription that corresponds to the spoken utterance captured in the audio data. The method further includes: determining, based on processing the transcription that corresponds to the spoken utterance, at least one assistant action to perform in response to receiving the spoken utterance; and classifying the spoken utterance as being spoken by a first user account corresponding to the first user. The first user account is one of the multiple user accounts associated with the shared assistant device. The method further includes, in response to classifying the spoken utterance as being spoken by the first user account: storing, in association with the first user account, one or more biasing parameters that are based on the spoken utterance. The one or more biasing parameters include: one or more speech biasing parameters that are based on one or more terms of the transcription; and/or one or more natural language understanding biasing parameters that are based on the at least one assistant action. Storing the one or more biasing parameters in association with the first user account causes future utterances to be processed using the one or more biasing parameters in response to the future utterances being classified as being spoken by the first user account. The method further includes determining whether to store the one or more biasing parameters in association with one or more additional user accounts of the multiple user accounts. Each of the additional user accounts are in addition to the first user account and are associated with a corresponding user that is in addition to the first user. The method further includes, in response to determining to store the one or more biasing parameters in association with the one or more additional user accounts: storing the one or more biasing parameters in association with at least a second user account of the one or more additional user accounts. Storing the one or more biasing parameters in association with the second user account causes future utterances to be processed using the one or more biasing parameters in response to the future utterances being classified as being spoken by the second user account. The method further includes, in response to determining to not store the one or more biasing parameters in association with the one or more additional user accounts: refraining from storing the one or more biasing parameters in association with any of the one or more additional user accounts.

These and other implementations disclosed herein can optionally include one or more of the following features.

In some implementations, determining whether to store the one or more biasing parameters in association with the one or more additional user accounts includes: determining that the at least one additional user was near the assistant device during the spoken utterance; and determining to store the one or more biasing parameters in association with the one or more additional user accounts based on determining that the at least one additional user was near the assistant device during the spoken utterance. In some versions of those implementations, determining that the at least one additional user was near the assistant device during the spoken utterance includes: determining, based on processing image data from a camera of the shared assistant device, that the at least one additional user was captured in the image data; and determining that the at least one additional user was near the assistant device during the spoken utterance based on determining that the at least one additional user was captured in the image data and based on the image data being captured during the spoken utterance or within a threshold amount of time relative to the spoken utterance. In some additional or alternative versions, determining that the at least one additional user was near the assistant device during the spoken utterance includes determining that the audio data captures an additional spoken utterance of the at least one additional user. In some additional or alternative versions, determining that the at least one additional user was near the assistant device during the spoken utterance includes: determining that additional audio data, received via the one or more microphones of the shared assistant device, captures an additional spoken utterance of the at least one additional user; and determining that the additional spoken utterance of the at least one additional user occurred within a threshold amount of time of the spoken utterance of the user. In some of those versions, determining whether to store the one or more biasing parameters in association with the one or more additional user accounts further includes: classifying the additional spoken utterance as being spoken by the second user account corresponding to the second user, the first user account being one of the multiple user accounts associated with the shared assistant device; and determining to store the one or more biasing parameters in association with the second user account based on classifying the additional spoken utterance as being spoken by the second user account. Classifying the additional spoken utterance as being spoken by the second user account can optionally include performing speaker identification based on the additional audio data and/or performing facial recognition based on image data captured during or near the additional spoken utterance.

In some implementations, the method further includes, in response to determining to store the one or more biasing parameters in association with the one or more additional user accounts: storing the one or more biasing parameters in association all of the additional user accounts, including the second user account and at least a third user account of the one or more additional user accounts.

In some implementations, determining whether to store the one or more biasing parameters in association with the one or more additional user accounts includes determining that the one or more biasing parameters are classified as non-sensitive. In some of those implementations, the one or more biasing parameters are classified as non-sensitive based on being for terms and/or topics that have a score that fails to satisfy a threshold (e.g. is below an inverse document frequency score that is below a threshold.

In some implementations, determining whether to store the one or more biasing parameters in association with the one or more additional user accounts includes: determining that at least one previous query, received at the shared assistant device, has one or more defined relationships to the transcription. In some of those implementations, the one or more defined relationships include a shared topic.

In some implementations, the one or more biasing parameters include the one or more speech biasing parameters that are based on the one or more terms of the transcription. In some of those implementations, the one or more speech biasing parameters include a first biasing parameter that is based on a particular term or a particular topic that is related to the one or more terms of the transcription, but that is not included in the one or more terms of the transcription.

In some implementations, the one or more biasing parameters include the one or more natural language understanding biasing parameters that are based on the at least one assistant action. In some of those implementations, determining, based on processing the transcription that corresponds to the spoken utterance, the at least one assistant action to perform in response to receiving the spoken utterance includes: determining, based on the transcription, to render a prompt seeking clarification on the intent of the spoken utterance; and determining, based on user interface input provided responsive to the prompt, to perform the at least one assistant action in response to the spoken utterance.

In some implementations, a method is provided that includes: receiving, via one or more microphones of a shared assistant device that is associated with multiple user accounts, audio data that captures a spoken utterance of a first user; generating, based on processing the audio data, a transcription that corresponds to the spoken utterance captured in the audio data; determining, based on processing the transcription that corresponds to the spoken utterance, at least one assistant action to perform in response to receiving the spoken utterance; and determining one or more biasing parameters that are based on the spoken utterance. The one or more biasing parameters include one or more speech biasing parameters that are based on one or more terms of the transcription; and/or one or more natural language understanding biasing parameters that are based on the at least one assistant action. The method further includes determining whether to store the one or more biasing parameters in association with the shared assistant device. The method further includes, in response to determining to store the one or more biasing parameters in association with the shared assistant device, storing the one or more biasing parameters in association with the shared assistant device. Storing the one or more biasing parameters in association with the shared assistant device causes future spoken utterances from at least all authorized users to be processed using the one or more biasing parameters.

These and other implementations disclosed herein can optionally include one or more of the following features.

In some implementations, storing the one or more biasing parameters in association with the shared assistant device causes all future spoken utterances to be processed using the one or more biasing parameters.

In some implementations, determining whether to store the one or more biasing parameters in association with the shared assistant device includes: classifying the spoken utterance as being provided by a first user; classifying a previous spoken utterance as being provided by a second user; and determining to store the one or more biasing parameters in association with the shared assistant device based on the biasing parameters being related to both the spoken utterance and the previous spoken utterance, and based on the spoken utterance and the previous spoken utterance being provided by both the first user and the second user.

In some implementations, a method is provided that includes: receiving, via one or more microphones of a shared assistant device that is associated with multiple user accounts, audio data that captures a spoken utterance of a first user; generating, based on processing the audio data, a transcription that corresponds to the spoken utterance captured in the audio data; and determining, based on processing the transcription that corresponds to the spoken utterance, at least one assistant action to perform in response to receiving the spoken utterance. The at least one assistant action includes storing an association of first data based on one or more first terms of the transcription to second data based on one or more second terms of the transcription. The method further includes classifying the spoken utterance as being spoken by a first user account corresponding to the first user. The first user account is one of the multiple user accounts associated with the shared assistant device. The method further includes determining whether to store the association of the first data to the second data as accessible to only the first user account or as accessible to the first user account and to one or more additional user accounts of the multiple user accounts. Each of the additional user accounts is in addition to the first user account and is associated with a corresponding user that is in addition to the first user. The method further includes, in response to determining to store the association as accessible to only the first user account, storing the association accessible to only the first user account without enabling access to the association by any of the additional user accounts. The method further includes, in response to determining to store the association as accessible to the first user account and to the one or more additional user accounts, storing the association as accessible to the first user account and as accessible by the one or more of the additional user accounts.

These and other implementations disclosed herein can optionally include one or more of the following features.

In some implementations, determining whether to store the association as accessible to only the first user account or as accessible to the first user account and to one or more additional user accounts includes: determining that the at least one additional user was near the assistant device during the spoken utterance; and determining to store the association as accessible to the first user account and to one or more additional user accounts based on determining that the at least one additional user was near the assistant device during the spoken utterance.

What is claimed is:

1. A method comprising:
receiving, via one or more microphones of a shared assistant device, audio data that captures a spoken utterance of a user;
generating, based on processing the audio data using a local speech-to-text (STT) engine of the shared assistant device, a transcription that corresponds to the spoken utterance captured in the audio data;
resolving, based on processing the transcription using a local natural language understanding (NLU) engine of the shared assistant device, an assistant action to perform in response to receiving the spoken utterance;
determining whether to store, locally at the shared assistant device, one or more NLU biasing parameters that are based on the assistant action resolved locally at the shared assistant device using the local NLU engine;
in response to determining to store the one or more NLU biasing parameters locally at the shared assistant device:
storing the one or more NLU biasing parameters locally at the shared assistant device;
wherein storing the one or more NLU biasing parameters locally at the shared assistant device causes future spoken utterances, from any user and received at the shared assistant device, to be processed by the local NLU engine using the one or more NLU biasing parameters.

2. The method of claim 1, wherein resolving the assistant action to perform in response to receiving the spoken utterance comprises:
determining, based on processing the transcription using the local NLU, a first candidate parameter and a conflicting second candidate parameter;
prompting the user to disambiguate between the first candidate parameter and the second candidate parameter; and
resolving, based on a response from the user to the prompting, the assistant action to include the first candidate parameter in lieu of the second candidate parameter.

3. The method of claim 2, wherein the NLU biasing parameters cause the local NLU engine to bias the future spoken utterances toward the first candidate parameter.

4. The method of claim 3, wherein the assistant action causes playing of a song and the first candidate parameter is a song parameter for the song.

5. The method of claim 1, wherein resolving the assistant action to perform in response to receiving the spoken utterance comprises:
determining, based on processing the transcription using the local NLU, a first candidate intent and a conflicting second candidate intent;
prompting the user to disambiguate between the first candidate intent and the second candidate intent; and resolving, based on a response from the user to the prompting, the assistant action to include the first candidate intent in lieu of the second candidate intent.

6. The method of claim 5, wherein the NLU biasing parameters cause the local NLU engine to bias the future spoken utterances toward the first candidate intent.

7. The method of claim 1, wherein determining whether to store the one or more NLU biasing parameters in association with the shared assistant device comprises:
classifying the spoken utterance as being provided by the user;
classifying a previous spoken utterance as being provided by an additional user; and
determining to store the one or more NLU biasing parameters in association with the shared assistant device based on the NLU biasing parameters being related to both the spoken utterance and the previous spoken utterance, and based on the spoken utterance and the previous spoken utterance being provided by both the user and the additional user.

8. A shared assistant device, comprising:
microphones;
memory storing instructions, a local speech-to-text (STT) engine, and a local natural language understanding (NLU) engine; and
one or more processors operable to execute the instructions stored in the memory to:
receive, via the microphones, audio data that captures a spoken utterance of a user;
generate, based on processing the audio data using the local STT engine, a transcription that corresponds to the spoken utterance captured in the audio data;
resolve, based on processing the transcription using the local NLU engine, an assistant action to perform in response to receiving the spoken utterance;
determine whether to store, locally at the shared assistant device, one or more NLU biasing parameters that are based on the assistant action resolved locally at the shared assistant device using the local NLU engine;
in response to determining to store the one or more NLU biasing parameters locally at the shared assistant device:
store the one or more NLU biasing parameters locally at the shared assistant device;
wherein storing the one or more NLU biasing parameters locally at the shared assistant device causes future spoken utterances, from any user and received at the shared assistant device, to be processed by the local NLU engine using the one or more NLU biasing parameters.

9. The shared assistant device of claim 8, wherein in resolving the assistant action to perform in response to receiving the spoken utterance one or more of the processors are to:
determine, based on processing the transcription using the local NLU, a first candidate parameter and a conflicting second candidate parameter;
prompt the user to disambiguate between the first candidate parameter and the second candidate parameter; and
resolve, based on a response from the user to the prompting, the assistant action to include the first candidate parameter in lieu of the second candidate parameter.

10. The shared assistant device of claim 9, wherein the NLU biasing parameters cause the local NLU engine to bias the future spoken utterances toward the first candidate parameter.

11. The shared assistant device of claim 10, wherein the assistant action causes playing of a song and the first candidate parameter is a song parameter for the song.

12. The shared assistant device of claim 8, wherein in resolving the assistant action to perform in response to receiving the spoken utterance one or more of the processors are to:
determine, based on processing the transcription using the local NLU, a first candidate intent and a conflicting second candidate intent;
prompt the user to disambiguate between the first candidate intent and the second candidate intent; and
resolve, based on a response from the user to the prompting, the assistant action to include the first candidate intent in lieu of the second candidate intent.

13. The shared assistant device of claim 12, wherein the NLU biasing parameters cause the local NLU engine to bias the future spoken utterances toward the first candidate intent.

14. The shared assistant device of claim 8, wherein in determining whether to store the one or more NLU biasing parameters in association with the shared assistant device one or more of the processors are to:
classify the spoken utterance as being provided by the user;
classify a previous spoken utterance as being provided by an additional user; and
determine to store the one or more NLU biasing parameters in association with the shared assistant device based on the NLU biasing parameters being related to both the spoken utterance and the previous spoken utterance, and based on the spoken utterance and the previous spoken utterance being provided by both the user and the additional user.

15. A method comprising:
receiving, via one or more microphones of a shared assistant device, audio data that captures a spoken utterance of a user;
generating, based on processing the audio data using a local speech-to-text (STT) engine of the shared assistant device, a transcription that corresponds to the spoken utterance captured in the audio data;
determining, based on processing the transcription using a local natural language understanding (NLU) engine of the shared assistant device, an assistant action to perform in response to receiving the spoken utterance;
determining whether to store, locally at the shared assistant device, one or more speech biasing parameters that are based on one or more terms of the transcription generated locally at the shared assistant device using the local STT engine, wherein determining whether to store the one or more speech biasing parameters locally at the shared assistant device comprises:
classifying the spoken utterance as being provided by the user,
classifying a previous spoken utterance as being provided by an additional user, and
determining to store the one or more speech biasing parameters in association with the shared assistant device based on the speech biasing parameters being related to both the spoken utterance and the previous spoken utterance, and based on the spoken utterance and the previous spoken utterance being provided by both the user and the additional user;
in response to determining to store the one or more speech biasing parameters locally at the shared assistant device:

storing the one or more speech biasing parameters locally at the shared assistant device;

wherein storing the one or more speech biasing parameters locally at the shared assistant device causes future spoken utterances, from any user and received at the shared assistant device, to be processed by the local STT engine using the one or more speech biasing parameters.

16. The method of claim 15, wherein the one or more speech biasing parameters are based on the one or more terms of the transcription, and wherein the one or more speech biasing parameters include a first biasing parameter that is based on a particular term or a particular topic that is related to the one or more terms of the transcription, but that is not included in the one or more terms of the transcription.

* * * * *